(12) United States Patent
Feng et al.

(10) Patent No.: US 10,491,676 B2
(45) Date of Patent: *Nov. 26, 2019

(54) INFORMATION SHARING METHOD, INFORMATION SHARING APPARATUS, AND ELECTRONIC DEVICE

(71) Applicant: TENCENT TECHNOLOGY (SHENZHEN) COMPANY LIMITED, Shenzhen (CN)

(72) Inventors: Cheng Feng, Shenzhen (CN); Wei Li, Shenzhen (CN); Danzhi Chen, Shenzhen (CN); Xi Wang, Shenzhen (CN); Kai Zhang, Shenzhen (CN); Xin Qing, Shenzhen (CN); Baisen He, Shenzhen (CN); Sirui Liu, Shenzhen (CN); Yulei Liu, Shenzhen (CN); Zhipei Wang, Shenzhen (CN); Ying Huang, Shenzhen (CN); Bo Hu, Shenzhen (CN); Tingyong Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,613

(22) Filed: Dec. 20, 2018

(65) Prior Publication Data
US 2019/0124151 A1 Apr. 25, 2019

Related U.S. Application Data

(63) Continuation of application No. 15/110,455, filed as application No. PCT/CN2015/070074 on Jan. 4, 2015, now Pat. No. 10,205,779.

(30) Foreign Application Priority Data

Jan. 9, 2014 (CN) .......................... 2014 1 0010604

(51) Int. Cl.
*H04L 29/08* (2006.01)
*H04W 76/11* (2018.01)

(52) U.S. Cl.
CPC .......... *H04L 67/1095* (2013.01); *H04L 67/02* (2013.01); *H04L 67/18* (2013.01); *H04W 76/11* (2018.02)

(58) Field of Classification Search
CPC ..... H04L 67/02; H04L 67/18; H04L 67/1095; H04L 67/1097; H04W 76/11
See application file for complete search history.

(56) References Cited

U.S. PATENT DOCUMENTS 7,822,821 B2 10/2010 Foote
8,966,595 B1 2/2015 Amacker
(Continued)

FOREIGN PATENT DOCUMENTS

CN 1937533 A 3/2007
CN 101778122 A 7/2010
(Continued)

OTHER PUBLICATIONS

The World Intellectual Property Organization (WIPO) International Search Report for PCT/CN2015/070074 dated Mar. 25, 2015.
(Continued)

*Primary Examiner* — Kostas J Katsikis
(74) *Attorney, Agent, or Firm* — Anova Law Group, PLLC (57) ABSTRACT

Embodiments of the present invention provide an information sharing method, an information sharing apparatus, and an electronic device. The method is implemented by a first electronic device. The method includes: when it is detected
(Continued)

that an electronic device binding option built in a browser is triggered, retrieving a dialog box built in the browser, where at least one electronic device binding function option may be set in the dialog box; when it is detected that an electronic device binding function option is triggered, executing a corresponding electronic device binding function in the background, and sending first information to a server; and after the server determines that a preset correspondence exists between second information sent by a second electronic device and the first information and establishes a binding relationship between the first electronic device and the second electronic device, sharing information between the first electronic device and the second electronic device. Embodiments of the present invention implement information sharing between electronic devices in a browser interface, thereby implementing convenient information sharing, and moreover ensuring accuracy of information sharing.

20 Claims, 8 Drawing Sheets

(56) References Cited

U.S. PATENT DOCUMENTS

| | | | |
|---|---|---|---|
| 9,406,043 B1 * | 8/2016 | Amacker | G06F 16/951 |
| 9,652,506 B2 | 5/2017 | James et al. | |
| 9,703,971 B2 * | 7/2017 | Hu | H04L 9/3228 |
| 2008/0052400 A1 | 2/2008 | Ekberg | |
| 2011/0145388 A1 | 6/2011 | Hao et al. | |
| 2011/0258300 A1 | 10/2011 | Hao et al. | |
| 2012/0236772 A1 * | 9/2012 | Kondratiev | H04L 67/325 370/311 |
| 2013/0159829 A1 | 6/2013 | James et al. | |
| 2015/0302215 A1 * | 10/2015 | Hu | H04L 9/3228 726/30 |
| 2017/0242645 A1 | 8/2017 | Wang et al. | |
| 2017/0249363 A1 | 8/2017 | James et al. | |

FOREIGN PATENT DOCUMENTS

| | | |
|---|---|---|
| CN | 102710750 A | 10/2012 |
| CN | 102857579 A | 1/2013 |
| CN | 103023930 A | 4/2013 |
| CN | 103078830 A | 5/2013 |
| CN | 103167424 A | 6/2013 |
| CN | 103248697 A | 8/2013 |
| CN | 103345506 A | 10/2013 |
| CN | 103501322 A | 1/2014 |
| CN | 204399900 U * | 6/2015 |
| CN | 105978880 A * | 9/2016 |

OTHER PUBLICATIONS

The State Intellectual Property Office of the People's Republic of China (SIPO) Office Action 1 for 201410010604.4 dated Aug. 27, 2018 9 Pages (including translation).

* cited by examiner

INFORMATION SHARING METHOD, INFORMATION SHARING APPARATUS, AND ELECTRONIC DEVICE

RELATED APPLICATION

This application is a continuation application of U.S. patent application Ser. No. 15/110,455, filed on Jul. 8, 2016. U.S. patent application Ser. No. 15/110,455 claims priority to PCT Application No. PCT/CN2015/070074, filed on Jan. 4, 2015, which claims priority to Chinese Patent Application No. 2014100106044, entitled "Information Sharing Method, Information Sharing Apparatus, and Electronic Device," filed on Jan. 9, 2014. The applications are incorporated by reference in their entirety.

FIELD OF THE TECHNOLOGY

The present disclosure relates to the technical field of information sharing, and more particularly to an information sharing method, an information sharing apparatus, and an electronic device.

BACKGROUND

Information sharing between electronic devices refers to transfer of information between at least two electronic devices bound to each other; and a binding operation between electronic devices is an important step for implementing information sharing between the electronic devices. Binding of electronic devices is to establish a correspondence and an association between at least two electronic devices, and confirmation of a sending device and a receiving device for information to be shared is implemented by using the established correspondence and association, to implement accurate sharing of the information to be shared.

In the process of research and practice, with the wide use of browsers, it becomes a need to implement information sharing between electronic devices in a browser interface. However, currently a binding operation between electronic devices is performed outside a browser interface; therefore, currently there is still no method for implementing information sharing between electronic devices in a browser interface, and it becomes a problem needing an urgent solution from a person skilled in the art to provide a method for implementing information sharing between electronic devices in a browser interface.

SUMMARY

In view of this, embodiments of the present invention provide an information sharing method, an information sharing apparatus, and an electronic device, to implement information sharing between electronic devices in a browser interface.

To implement the foregoing objective, the embodiments of the present invention provide the following technical solutions:

An information sharing method, applied to a first electronic device. The method includes the following steps.

When it is detected that an electronic device binding option built in a browser is triggered, retrieving a dialog box built in the browser, where at least one electronic device binding function option may be set in the dialog box, and one electronic device binding function option corresponds to triggering of one electronic device binding function.

When it is detected that an electronic device binding function option is triggered, executing a corresponding electronic device binding function in the background, and sending first information to a server.

After the server determines that a preset correspondence exists between second information sent by a second electronic device and the first information and establishes a binding relationship between the first electronic device and the second electronic device, sharing information between the first electronic device and the second electronic device.

An embodiment of the present invention further provides an information sharing apparatus, applied to a first electronic device. The apparatus includes the following.

A first detection module, configured to detect whether an electronic device binding option built in a browser is triggered.

A dialog box retrieval module, configured to: when the first detection module detects that the electronic device binding option built in the browser is triggered, retrieve a dialog box built in the browser, where at least one electronic device binding function option may be set in the dialog box, and one electronic device binding function option corresponds to triggering of one electronic device binding function.

A second detection module, configured to detect whether an electronic device binding function option is triggered.

A binding function execution module, configured to: when the second detection module detects that an electronic device binding function option is triggered, execute a corresponding electronic device binding function in the background.

A sending module, configured to send first information to a server.

An information sharing module, configured to: after the server determines that a preset correspondence exists between second information sent by a second electronic device and the first information and establishes a binding relationship between the first electronic device and the second electronic device, perform information sharing between the first electronic device and the second electronic device.

An embodiment of the present invention further provides an electronic device, including the foregoing information sharing apparatus.

Based on the foregoing technical solution, in the information sharing method provided in embodiments of the present invention, when an electronic device binding option built in a browser is triggered, a dialog box built in the browser is retrieved. When an electronic device binding function option in the dialog box is triggered, a corresponding electronic device binding function is executed in the background, and first information is sent to a server. After the server determines that a preset correspondence exists between second information sent by a second electronic device and the first information and establishes a binding relationship between a first electronic device and the second electronic device, information sharing is performed between the first electronic device and the second electronic device.

In the information sharing method provided in embodiments of the present invention, a binding relationship between electronic devices may be established in a browser interface, to implement information sharing between electronic devices in a browser interface. Embodiments of the present disclosure enable information sharing between electronic devices in a browser interface. Therefore, information sharing between electronic devices becomes more convenient. Moreover, the server is used to perform confirmation on the correspondence between the first information sent by the first electronic device and the second information sent by the second electronic device, thereby ensuring accuracy of binding between the first electronic device and the second electronic device, and ensuring accuracy of a receiver and a sender in information sharing.

BRIEF DESCRIPTION OF THE DRAWINGS

To illustrate the technical solutions in the embodiments of the present invention or in the prior art more clearly, drawings required in description of the embodiments or the prior art will be introduced simply in the following. It is obvious that the drawings in the following description are only some of the embodiments of the present invention, and a person of ordinary skill in the art may obtain other drawings based on the drawings without creative efforts.

DESCRIPTION OF EMBODIMENTS

To make the objectives, technical solutions, and advantages in the embodiments of the present invention clearer, the following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

Figure 1:
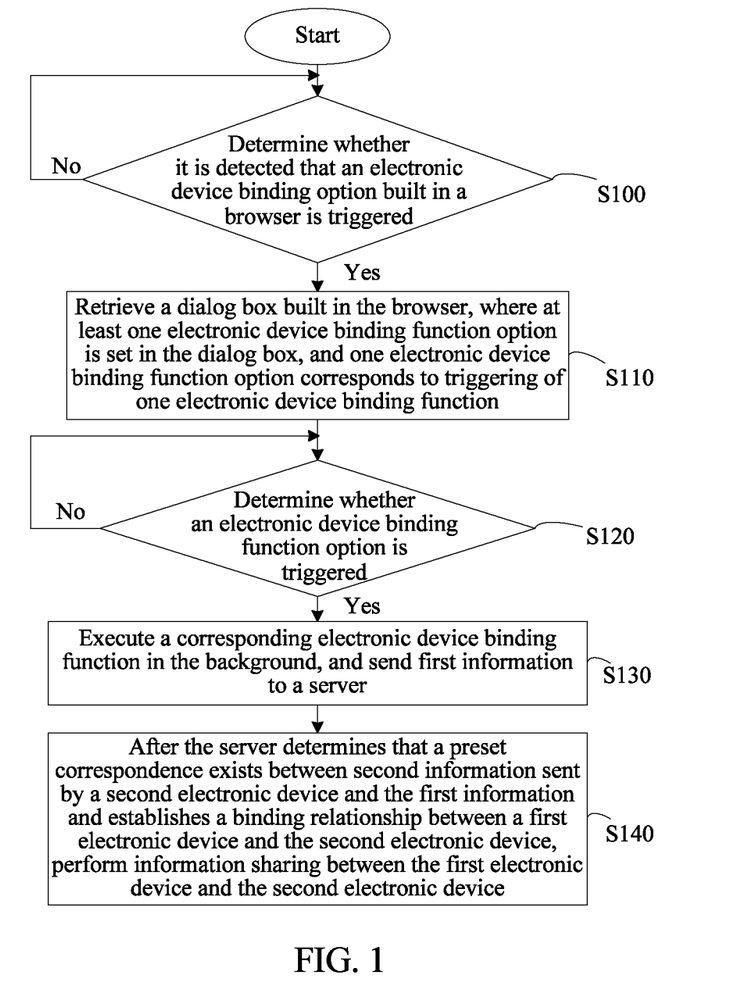
FIG. 1 is a flowchart of an information sharing method provided in an embodiment of the present invention.

FIG. 1 is a flowchart of an information sharing method provided in an embodiment of the present invention. The method may be used by a first electronic device, and the first electronic device may be any electronic device in a browser open state. Referring to FIG. 1, the method may include the following steps.

Step S100: Determine whether it is detected that an electronic device binding option built in a browser is triggered, and if yes, execute step S110, or if not, execute step S100.

In this embodiment of the present invention, one option may be set in the browser to correspond to an electronic device binding operation. When the option is triggered, it may be determined that the first electronic device currently needs to perform a binding operation with another electronic device. Optionally, a user may trigger the electronic device binding option by using a click operation. After the user clicks the electronic device binding option, the first electronic device may generate corresponding electronic device binding option click information, and detection of triggering of the electronic device binding option may be implemented by detecting whether electronic device binding option click information is generated.

Step S110: Retrieve a dialog box built in the browser, where at least one electronic device binding function option may be set in the dialog box, and one electronic device binding function option corresponds to triggering of one electronic device binding function.

Optionally, in this embodiment of the present invention, a dialog box may be built in the browser. When the electronic device binding option click information is detected, retrieve the built-in dialog box, where at least one electronic device binding function option may be set in the dialog box, and one electronic device binding function option corresponds to triggering of one electronic device binding function, that is, after an electronic device binding function option is clicked by a user, the first electronic device executes a corresponding electronic device binding function.

Optionally, for an electronic device binding function, an electronic device binding function may be implemented by using a 2D code, an electronic device binding function may be implemented by using a signal, an electronic device binding function may be implemented by using Location Based Services (LBS), and the like.

Step S120: Determine whether an electronic device binding function option is triggered, and if yes, execute step S130, or if not, repeat step S120.

Step S130: Execute a corresponding electronic device binding function in the background, and send first information to a server.

In this embodiment of the present invention, the content of the first information may be adaptively adjusted and changed according to different executed electronic device binding functions.

Step S140: After the server determines that a preset correspondence exists between second information sent by a second electronic device and the first information and establishes a binding relationship between the first electronic device and the second electronic device, perform information sharing between the first electronic device and the second electronic device.

The second electronic device may be any electronic device that needs to establish a binding relationship with the first electronic device to perform information sharing.

The shared information may be webpage information of a browser or electronic device information that can be retrieved by a browser, for example, audio information, video information, text information, or image information.

In this embodiment of the present invention, the content of the second information may be adjusted according to the adjustment of the first information, and the preset correspondence may be adjusted and changed according to different executed electronic device binding functions.

In the information sharing method provided in the embodiment of the present invention, when an electronic device binding option built in a browser is triggered, a dialog box built in the browser is retrieved, when an electronic device binding function option in the dialog box is triggered, a corresponding electronic device binding function is executed in the background, and first information is sent to a server, and after the server determines that a preset correspondence exists between second information sent by a second electronic device and the first information and establishes a binding relationship between a first electronic device and the second electronic device, information sharing is performed between the first electronic device and the second electronic device. In the information sharing method provided in the embodiment of the present invention, a binding relationship between electronic devices may be established in a browser interface, to implement information sharing between electronic devices through a browser interface, thereby solving a problem in which information sharing between electronic devices cannot be implemented in a browser interface because currently a binding operation between electronic device is performed outside a browser interface. Therefore, information sharing between electronic devices becomes more convenient. Moreover, the server is used to perform confirmation on the correspondence between the first information sent by the first electronic device and the second information sent by the second electronic device, thereby ensuring accuracy of binding between the first electronic device and the second electronic device, and ensuring accuracy of a receiver and a sender in information sharing.

Figure 2:
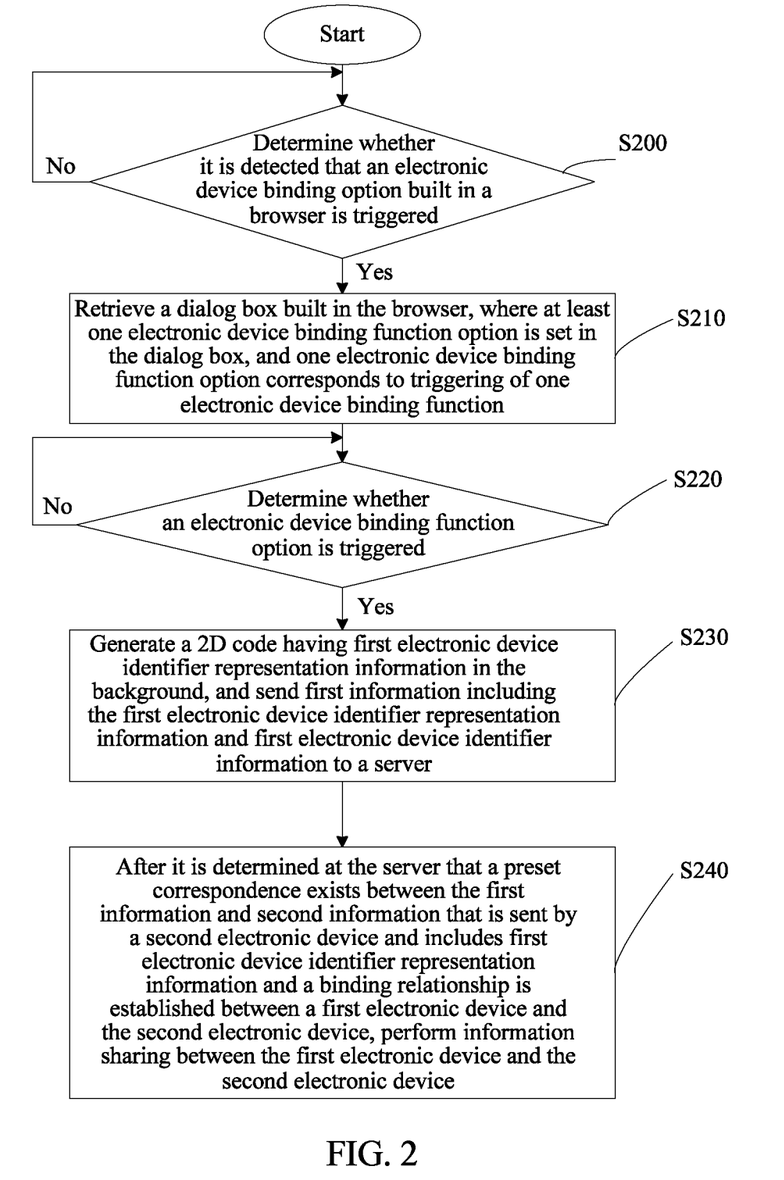
FIG. 2 is another flowchart of an information sharing method provided in an embodiment of the present invention.

Optionally, in an embodiment of the present invention, binding between a first electronic device and a second electronic device may be implemented by using a 2D code function, to implement information sharing. Correspondingly, FIG. 2 shows another procedure of an information sharing method provided in the embodiment of the present invention. Referring to FIG. 2, the method may include the following steps.

Step S200: Determine whether it is detected that an electronic device binding option built in a browser is triggered, and if yes, execute step S210, or if not, execute step S200.

Step S210: Retrieve a dialog box built in the browser, where at least one electronic device binding function option may be set in the dialog box, and one electronic device binding function option corresponds to triggering of one electronic device binding function.

Step S220: Determine whether an electronic device binding function option is triggered, and if yes, execute step S230, or if not, execute step S220.

Step S230: Generate a 2D code having first electronic device identifier representation information in the background, and send first information including the first electronic device identifier representation information and first electronic device identifier information to a server.

Optionally, the generated 2D code may be displayed in a child dialog box of the dialog box. The first electronic device identifier information may be information such as a device ID and an IP address that can uniquely represent the identity of the first electronic device. The first electronic device identifier representation information may be information that uniquely corresponds to the first electronic device identifier information. For example, it may be set that the first electronic device identifier representation information 001 uniquely corresponds to the first electronic device identifier information, that is, in the server, 001 can no longer correspond to another piece of electronic device identifier information.

Step S240: After it is determined at the server that a preset correspondence exists between the first information and second information that is sent by the second electronic device and includes first electronic device identifier representation information and a binding relationship is established between the first electronic device and the second electronic device, perform information sharing between the first electronic device and the second electronic device.

Optionally, the preset correspondence may be that the first electronic device identifier representation information in the second information and the first electronic device identifier representation information in the first information are same and match each other.

Optionally, after the first electronic device generates the 2D code having the first electronic device identifier representation information, the second electronic device may scan the 2D code, and determine the first electronic device identifier representation information by using the 2D code. After determining the first electronic device identifier representation information, the second electronic device may send the second information including the first electronic device identifier representation information to the server. After receiving the second information that is sent by the second electronic device and includes the first electronic device identifier representation information, the server may detect whether the first electronic device identifier representation information in the first information and the first electronic device identifier representation information in the second information match each other (because information in the 2D code is easily tampered with, it is detected at the server whether the first electronic device identifier representation information saved in advance in the server and the first electronic device identifier representation information sent by the second electronic device match each other to determine whether the identity of the second electronic device is valid, that is, whether the second electronic device is the device that has scanned the 2D code, thereby ensuring accuracy of device binding). After determining that they match each other, the server may determine that a preset correspondence exists between the second information and the first information, and when a browser of the second electronic device is in an open state, the server sends the first electronic device identifier information to the second electronic device, to establish a binding relationship between the first electronic device and the second electronic device, or, sends the second electronic device identifier information included in the second information to the first electronic device, to establish a binding relationship between the first electronic device and the second electronic device.

Optionally, if the server implements establishment of a binding relationship between the first electronic device and the second electronic device in the manner of sending the first electronic device identifier information to the second electronic device, the second information sent by the second electronic device to the server may further include browser switch state information. When determining that the browser switch state information and the browser open state information correspond to each other, the server may determine whether the second electronic device is currently in a browser open state, and may send the first electronic device identifier information to the second electronic device, to display the first electronic device identifier in a device list binding dialog box of a browser of the second electronic device. The second electronic device may send, by using the first electronic device identifier information, information to be shared to the server corresponding to sharing, to share, with the first electronic device by using the server corresponding to sharing, the information to be shared.

Optionally, the second information may also include the second electronic device identifier information, and the server may send the second electronic device identifier information to the first electronic device, to display the second electronic device identifier in a device list binding dialog box of a browser of the first electronic device. The first electronic device may send, by using the second electronic device identifier information, information to be shared to the server corresponding to sharing, to share, with the second electronic device by using the server corresponding to sharing, the information to be shared.

Optionally, the foregoing manner of implementing binding between electronic devices by using a 2D code may also be performed in a case in which the first electronic device is disconnected from a network. After scanning the 2D code, the second electronic device may upload the first electronic device identifier representation information to the server, and the server may determine, in a case in which a network connection of the first electronic device is restored, that a preset correspondence exists between the first information and the second information, to establish a binding relationship between the first electronic device and the second electronic device.

Figure 3:
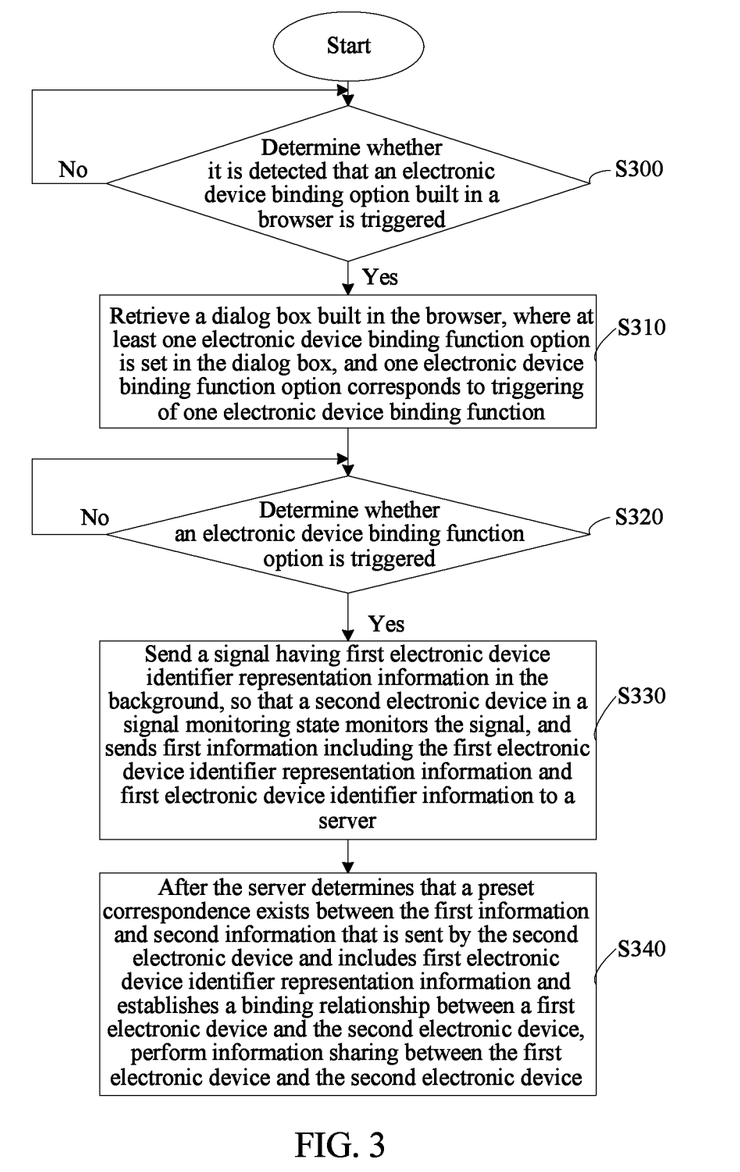
FIG. 3 is still another flowchart of an information sharing method provided in an embodiment of the present invention.

Optionally, in an embodiment of the present invention, binding between a first electronic device and a second electronic device may be implemented by using a signal function, to implement information sharing. Correspondingly, FIG. 3 shows still another procedure of an information sharing method provided in the embodiment of the present invention. Referring to FIG. 3, the method may include the following steps.

Step S300: Determine whether it is detected that an electronic device binding option built in a browser is triggered, and if yes, execute step S310, or if not, execute step S300.

Step S310: Retrieve a dialog box built in the browser, where at least one electronic device binding function option may be set in the dialog box, and one electronic device binding function option corresponds to triggering of one electronic device binding function.

Step S320: Determine whether an electronic device binding function option is triggered, and if yes, execute step S330, or if not, execute step S320.

Step S330: Send a signal including first electronic device identifier representation information in the background, so that the second electronic device in a signal monitoring state monitors the signal, and sends first information including the first electronic device identifier representation information and first electronic device identifier information to a server.

Optionally, the dialog box may be used to present a state of sending a signal, and after receiving the signal, the second electronic device may send reception confirmation information to the first electronic device, to change a presented state of the signal in the dialog box to "received".

Step S340: After the server determines that a preset correspondence exists between the first information and the second information that is sent by the second electronic device and includes first electronic device identifier representation information and establishes a binding relationship between the first electronic device and the second electronic device, perform information sharing between the first electronic device and the second electronic device.

Optionally, the preset correspondence may be that the first electronic device identifier representation information in the first information and the first electronic device identifier representation information in the second information match each other.

Optionally, after monitoring the signal, the second electronic device may obtain the first electronic device identifier representation information by parsing the signal. After determining the first electronic device identifier representation information, the second electronic device may send the second information including the first electronic device identifier representation information to the server. After receiving the second information that is sent by the second electronic device and includes the first electronic device identifier representation information, the server may detect whether the first electronic device identifier representation information in the first information and the first electronic device identifier representation information in the second information match each other (accuracy of device binding is ensured by using the mechanism). After determining that they match each other, the server may determine that a preset correspondence exists between the second information and the first information, and when a browser of the second electronic device is in an open state, the server sends the first electronic device identifier information to the second electronic device, to establish a binding relationship between the first electronic device and the second electronic device, or, sends the second electronic device identifier information included in the second information to the first electronic device, to establish a binding relationship between the first electronic device and the second electronic device.

Optionally, the foregoing manner of implementing binding between electronic devices by using a signal may also be performed in a case in which the first electronic device is disconnected from a network. After monitoring a signal, the second electronic device may upload the first electronic device identifier representation information to the server, and the server may determine, in a case in which a network connection of the first electronic device is restored, that a preset correspondence exists between the first information and the second information, to establish a binding relationship between the first electronic device and the second electronic device.

Figure 4:
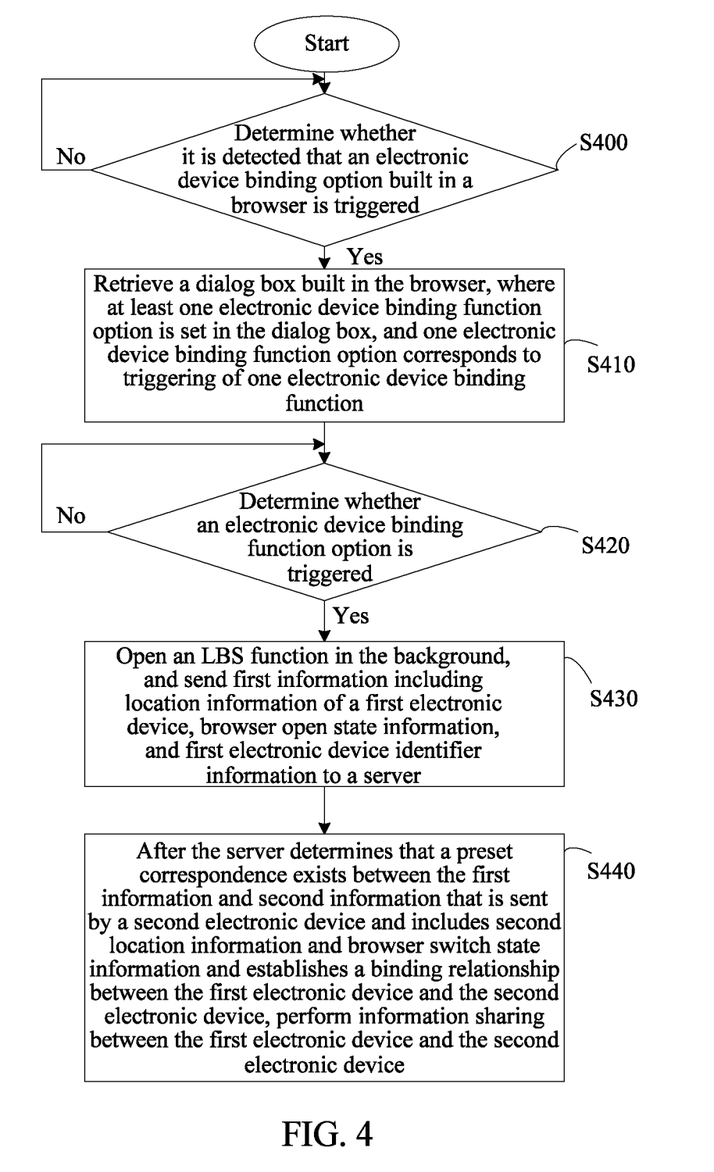
FIG. 4 is yet another flowchart of an information sharing method provided in an embodiment of the present invention.

Optionally, in an embodiment of the present invention, binding between electronic devices may be implemented by using a LBS function. Correspondingly, FIG. 4 shows yet another procedure of an information sharing method provided in the embodiment of the present invention. Referring to FIG. 4, the method may include:

Step S400: Determine whether it is detected that an electronic device binding option built in a browser is triggered, and if yes, execute step S410, or if not, repeat step S400.

Step S410: Retrieve a dialog box built in the browser, where at least one electronic device binding function option may be set in the dialog box, and one electronic device binding function option corresponds to triggering of one electronic device binding function.

Step S420: Determine whether an electronic device binding function option is triggered, and if yes, execute step S430, or if not, execute step S420.

Step S430: Open an LBS function in the background, and send first information including location information of a first electronic device, browser open state information, and first electronic device identifier information to a server.

Step S440: After the server determines that a preset correspondence exists between the first information and second information that is sent by a second electronic device and includes second location information and browser switch state information and establishes a binding relationship between the first electronic device and the second electronic device, perform information sharing between the first electronic device and the second electronic device.

Optionally, the preset correspondence may be that a location corresponding to the location information of the first electronic device and a location corresponding to location information of the second electronic device meet a preset location relationship, and the browser switch state information and the browser open state information correspond to each other.

Optionally, when the first electronic device opens an LBS function, the second electronic device may open an LBS function, and send the location information of the second electronic device and the browser switch state information to a server. The server may compare a location corresponding to the received location information of the first electronic device with a location corresponding to the location information of the second electronic device. If a location relationship between the first electronic device and the second electronic device meets a preset location relationship (for example, the distance between the locations meets a preset range) and when it may be determined by using the browser switch state information that a browser of the second electronic device is in an open state, the server may determine that a correspondence may be established between the first electronic device and the second electronic device. The server may send first electronic device identifier information to the second electronic device, and display the first electronic device identifier in a device list binding dialog box of the browser of the second electronic device, to enable the second electronic device to send, by using the first electronic device identifier information, information to be shared to the server corresponding to sharing, to share, with the first electronic device by using the server corresponding to information sharing, the information to be shared; or, the second information may also include the second electronic device identifier information, and the server may also send the second electronic device identifier information to the first electronic device, and display the second electronic device identifier in a device list binding dialog box of the browser of the first electronic device, to enable the first electronic device to send, by using the second electronic device identifier information, information to be shared to the server corresponding to sharing, and share, with the second electronic device by using the server corresponding to information sharing, the information to be shared.

Figure 5:
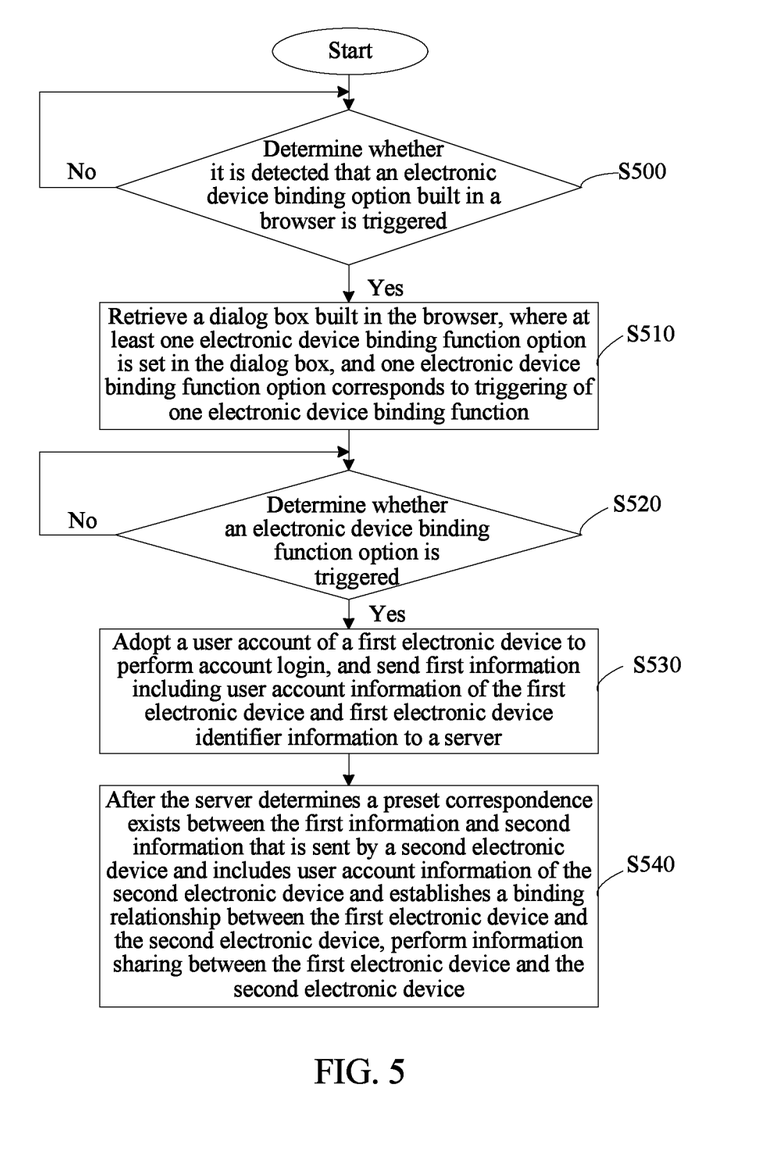
FIG. 5 is still yet another flowchart of an information sharing method provided in an embodiment of the present invention.

Optionally, in an embodiment of the present invention, binding between a first electronic device and a second electronic device may further be performed by using a same login account. Correspondingly, FIG. 5 shows still yet another procedure of an information sharing method provided in the embodiment of the present invention. Referring to FIG. 5, the method may include the following steps.

Step S500: Determine whether it is detected that an electronic device binding option built in a browser is triggered, and if yes, execute step S510, or if not, execute step S500.

Step S510: Retrieve a dialog box built in the browser, where at least one electronic device binding function option may be set in the dialog box, and one electronic device binding function option corresponds to triggering of one electronic device binding function.

Step S520: Determine whether an electronic device binding function option is triggered, and if yes, execute step S530, or if not, execute step S520.

Step S530: Obtain a user account of the first electronic device to perform account login, and send first information including user account information of the first electronic device and first electronic device identifier information to a server.

The user account of the first electronic device may be obtained to log in to the browser, or to log in to another application.

Step S540: After the server determines a preset correspondence exists between the first information and second information that is sent by the second electronic device and includes user account information of the second electronic device and establishes a binding relationship between the first electronic device and the second electronic device, perform information sharing between the first electronic device and the second electronic device.

Optionally, the preset correspondence may be that the user account information of the second electronic device and the user account information of the first electronic device are same.

Optionally, when determining that the first electronic device and the second electronic device use a same user account to log in to a same application, the server may determine that the first electronic device and the second electronic device have a binding relationship. When a browser of the second electronic device is in an open state, the server may send the first electronic device identifier information to the second electronic device, to display the first electronic device identifier in a device list binding dialog box of the browser of the second electronic device. The second electronic device may send, by using the first electronic device identifier information, information to be shared to the server corresponding to sharing, to share, with the first electronic device by using the server corresponding to information sharing, the information to be shared. Optionally, the second electronic device may send browser switch state information to the server, to determine, by using the browser switch state information, whether the browser of the second electronic device is in an open state.

Optionally, the second information may also include the second electronic device identifier information, and the server may send the second electronic device identifier information to the first electronic device, to display the second electronic device identifier in a device list binding dialog box of a browser of the first electronic device. The first electronic device may send, by using the second electronic device identifier information, information to be shared to the server corresponding to sharing, to share, with the second electronic device by using the server corresponding to information sharing, information to be shared.

Optionally, after a binding relationship is established between the first electronic device and the second electronic device, the first electronic device and the second electronic device may share, by using the server, information that can be retrieved by the browser.

Optionally, the first electronic device may establish binding relationships with multiple electronic devices in multiple binding manners described above, and the identifier of each bound electronic device may be displayed in a device list binding dialog box of the browser of the first electronic device.

In the information sharing method provided in this embodiment of the present invention, information sharing between electronic devices is implemented in a browser interface, thereby implementing convenient information sharing between electronic devices, and moreover ensuring accuracy of a receiver and a sender in information sharing.

An information sharing apparatus provided in an embodiment of the present invention is introduced below, and for the information sharing apparatus described below and the information sharing method described above, reference may be made to each other.

Figure 6:
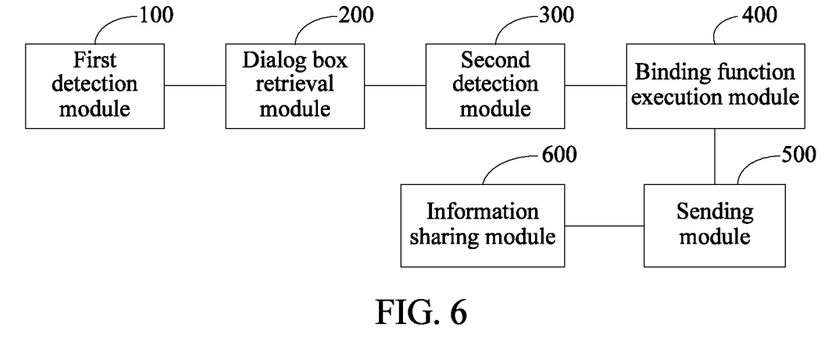
FIG. 6 is a structural block diagram of an information sharing apparatus provided in an embodiment of the present invention.

FIG. 6 is a structural block diagram of an information sharing apparatus provided in the embodiment of the present invention. The information sharing apparatus may be used by a first electronic device. Referring to FIG. 6, the information sharing apparatus may include the following components.

A first detection module 100 is configured to detect whether an electronic device binding option built in a browser is triggered.

A dialog box retrieval module 200 is configured to: when the first detection module 100 detects that the electronic device binding option built in the browser is triggered, retrieve a dialog box built in the browser, where at least one electronic device binding function option may be set in the dialog box, and one electronic device binding function option corresponds to triggering of one electronic device binding function.

A second detection module 300 is configured to detect whether an electronic device binding function option is triggered.

A binding function execution module 400 is configured to: when the second detection module 300 detects that the electronic device binding function option is triggered, execute a corresponding electronic device binding function in the background.

A sending module 500 is configured to send first information to a server.

An information sharing module 600 is configured to: after the server determines that a preset correspondence exists between second information sent by a second electronic device and the first information and establishes a binding relationship between the first electronic device and the second electronic device, perform information sharing between the first electronic device and the second electronic device.

Figure 7:
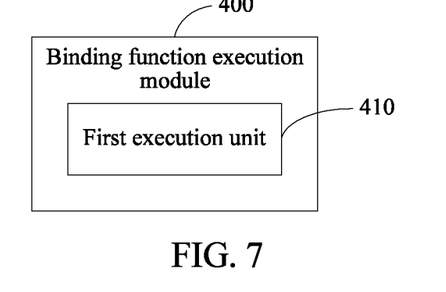
FIG. 7 is a structural block diagram of a binding function execution module provided in an embodiment of the present invention.

Optionally, in this embodiment of the present invention, binding between the first electronic device and the second electronic device may be implemented by using a 2D code function, to implement information sharing. Correspondingly, FIG. 7 shows an optional structure of the binding function execution module 400. Referring to FIG. 7, the binding function execution module 400 may include:

A first execution unit 410 is configured to generate a 2D code having first electronic device identifier representation information in the background, and display the 2D code in a child dialog box of the dialog box.

Figure 8:
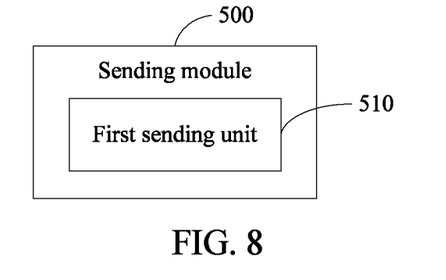
FIG. 8 is a structural block diagram of a sending module provided in an embodiment of the present invention.

Correspondingly, FIG. 8 shows an optional structure of the sending module 500. Referring to FIG. 8, the sending module 500 may include the following components.

A first sending unit 510 is configured to send first information including the first electronic device identifier representation information and first electronic device identifier information to a server.

Correspondingly, after the second electronic device scans the 2D code and determines the first electronic device identifier representation information, the server may receive second information that is sent by the second electronic device and includes first electronic device identifier representation information. If the first electronic device identifier representation information in the first information and the first electronic device identifier representation information in the second information match each other, the server may determine that a preset correspondence exists between the second information and the first information. When a browser of the second electronic device is in an open state, the server may send the first electronic device identifier information to the second electronic device, to establish a binding relationship between the first electronic device and the second electronic device, or, the server may send the second electronic device identifier information included in the second information to the first electronic device, to establish a binding relationship between the first electronic device and the second electronic device. After a binding relationship is established between the first electronic device and the second electronic device, the information sharing module 600 may perform information sharing between the first electronic device and the second electronic device.

Figure 9:
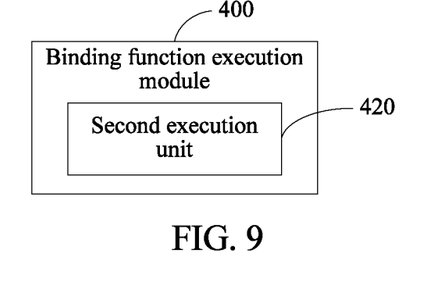
FIG. 9 is another structural block diagram of a binding function execution module provided in an embodiment of the present invention.

Optionally, in this embodiment of the present invention, binding between the first electronic device and the second electronic device may be implemented by using a signal function, to implement information sharing. Correspondingly, FIG. 9 shows another optional structure of the binding function execution module 400. Referring to FIG. 9, the binding function execution module 400 may include the following components, A second execution unit 420 is configured to send a signal including the first electronic device identifier representation information in the background, so that the second electronic device in a signal monitoring state monitors the signal.

Figure 10:
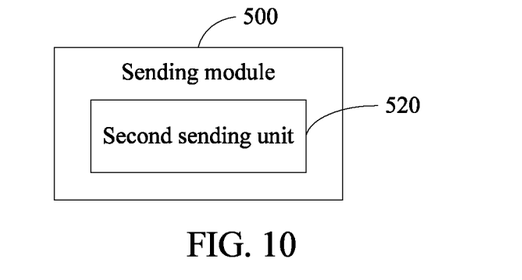
FIG. 10 is another structural block diagram of a sending module provided in an embodiment of the present invention.

Correspondingly, FIG. 10 shows another optional structure of the sending module 500. Referring to FIG. 10, the sending module 500 may include:

A second sending unit 520 is configured to send first information including the first electronic device identifier representation information and first electronic device identifier information to a server.

Correspondingly, after the second electronic device in a signal monitoring state monitors the signal and determines the first electronic device identifier representation information, the server may receive second information that is sent by the second electronic device and includes first electronic device identifier representation information. If the first electronic device identifier representation information in the first information and the first electronic device identifier representation information in the second information match each other, the server may determine that a preset correspondence exists between the second information and the first information. When a browser of the second electronic device is in an open state, the server may send the first electronic device identifier information to the second electronic device, to establish a binding relationship between the first electronic device and the second electronic device, or, the server may send the second electronic device identifier information included in the second information to the first electronic device, to establish a binding relationship between the first electronic device and the second electronic device. After a binding relationship is established between the first electronic device and the second electronic device, the information sharing module 600 may perform information sharing between the first electronic device and the second electronic device.

Figure 11:
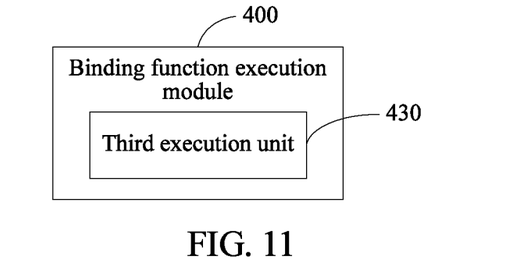
FIG. 11 is still another structural block diagram of a binding function execution module provided in an embodiment of the present invention.

Optionally, in this embodiment of the present invention, binding between electronic devices may be implemented by using an LBS function. Correspondingly, FIG. 11 shows still another optional structure of the binding function execution module 400. Referring to FIG. 11, the binding function execution module 400 may include the following components.

A third execution unit 430 is configured to open an LBS function in the background.

Figure 12:
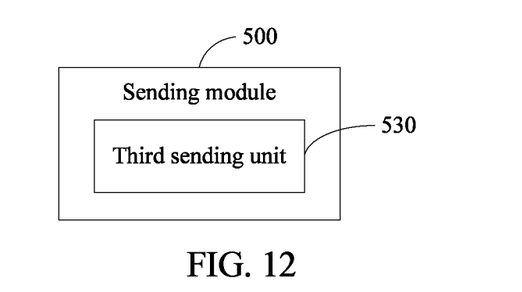
FIG. 12 is still another structural block diagram of a sending module provided in an embodiment of the present invention.

Correspondingly, FIG. 12 shows still another optional structure of the sending module 500. Referring to FIG. 12, the sending module 500 may include:

A third sending unit 530 is configured to send first information including location information of the first electronic device, browser open state information, and first electronic device identifier information to a server.

Correspondingly, the server may receive second information that is sent by the second electronic device in which an LBS function is opened and includes location information of the second electronic device and browser switch state information. If a location corresponding to first location information and a location corresponding to second location information meet a preset location relationship, and the browser switch state information and the browser open state information correspond to each other, the server may determine that a preset correspondence exists between the second information and the first information. The server may send the first electronic device identifier information to the second electronic device, to establish a binding relationship between the first electronic device and the second electronic device, or, the server may send the second electronic device identifier information included in the second information to the first electronic device, to establish a binding relationship between the first electronic device and the second electronic device. After a binding relationship is established between the first electronic device and the second electronic device, the information sharing module 600 may perform information sharing between the first electronic device and the second electronic device.

Figure 13:
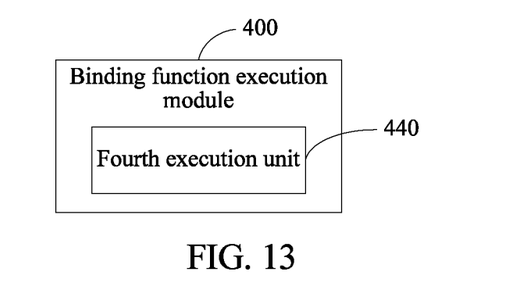
FIG. 13 is still yet another structural block diagram of a binding function execution module provided in an embodiment of the present invention.

Optionally, in this embodiment of the present invention, binding between the first electronic device and the second electronic device may further be performed by using a same login account. Correspondingly, FIG. 13 shows still yet another optional structure of the binding function execution module 400. Referring to FIG. 13, the binding function execution module 400 may include the following components.

A fourth execution unit 440 is configured to obtain a user account of the first electronic device to perform account login.

Figure 14:
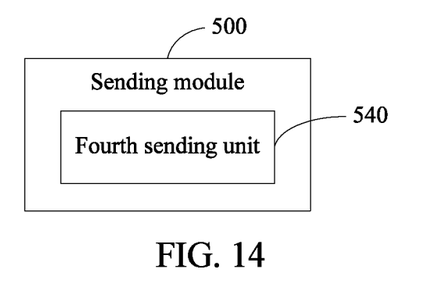
FIG. 14 is still yet another structural block diagram of a sending module provided in an embodiment of the present invention.

Correspondingly, FIG. 14 shows still yet another optional structure of the sending module 500. Referring to FIG. 14, the sending module 500 may include the following.

A fourth sending unit 540 is configured to send first information including user account information of the first electronic device and first electronic device identifier information to a server.

Correspondingly, after the second electronic device obtains a user account of the second electronic device to perform account login, the server may receive second information that is sent by the second electronic device and includes user account information of the second electronic device. If the user account information of the first electronic device and the user account information of the second electronic device are same, the server may determine that a preset correspondence exists between the second information and the first information. When a browser of the second electronic device is in an open state, the server may send the first electronic device identifier information to the second electronic device, to establish a binding relationship between the first electronic device and the second electronic device, or, the server may send the second electronic device identifier information included in the second information to the first electronic device, to establish a binding relationship between the first electronic device and the second electronic device.

In the information sharing method provided in this embodiment of the present invention, information sharing between electronic devices is implemented in a browser interface, thereby implementing convenient information sharing between electronic devices, and moreover ensuring accuracy of a receiver and a sender in information sharing.

An embodiment of the present invention further provides an electronic device, including the foregoing information sharing apparatus. Reference may be made to the above description of a corresponding part for detailed description of the information sharing apparatus, which is no longer described here.

Figure 15:
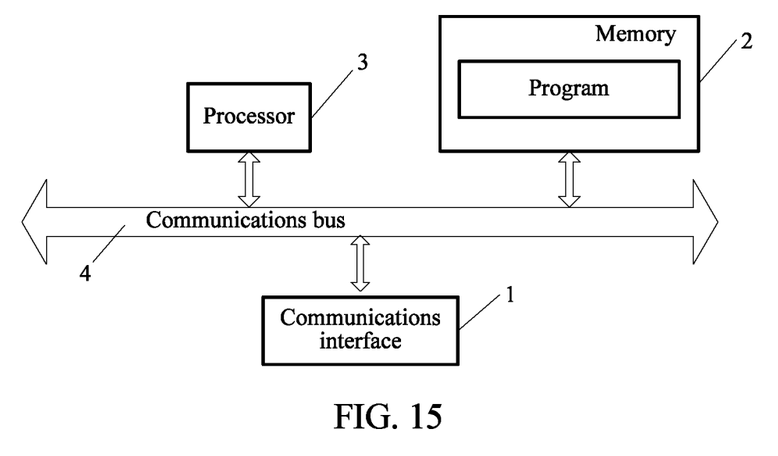
FIG. 15 is a structural diagram of hardware of an electronic device provided in an embodiment of the present invention.

A hardware structure of the electronic device provided in this embodiment of the present invention is introduced below. FIG. 15 is a structural diagram of hardware of the electronic device provided in this embodiment of the present invention. Referring to FIG. 15, the electronic device may include: a communications interface 1, a memory 2, a processor 3, and a communications bus 4.

Each constituent part of the electronic device is introduced in detail below with reference to FIG. 15.

The communications interface 1 may be an interface for a communications module, for example, an interface for a network card, and is configured to implement reception and sending of signals in a process that the electronic device performs information reception and transmission with an external device. The communications interface 1 may also be a browser or other user interfaces.

The memory 2 may be configured to store a software program and module. The processor 3 runs the software program and module stored in the memory 2 to execute various functional applications and data processing of the electronic device. The memory 2 may mainly include a program storage region and a data storage region, where the program storage region may store an operating system, an application program (for example, an audio playing function and an image playing function) required for at least one function, and the like, and the data storage region may store data (for example, audio data and an address book) created according to the use of the electronic device. In addition, the memory 2 may include a high-speed random access memory, and may further include a nonvolatile memory, for example, at least one disk storage device, a flash memory device or another volatile solid-state storage device.

In embodiments of the present disclosure, the modules described in FIGS. 6-14 are computer programs that may be store in memory 2.

The processor 3 is a control center of the electronic device and is connected to each part of the entire electronic device by using various interfaces and circuits, and executes various functions and processing data of the electronic device by running or executing the software program and/or module stored in the memory 2 and invoking data stored in the memory 2, to perform overall monitoring on the electronic device. Optionally, the processor 3 may include one or more processing units. Preferably, the processor 3 may integrate an application processor and a modem processor, where the application processor mainly processes an operating system and application programs, whereas the modem processor mainly processes wireless communication. It may be understood that the foregoing modem processor may also be not integrated in the processor 3.

The communications interface 1, the memory 2, and the processor 3 accomplish communication each other by using the communications bus 4.

In this embodiment of the present invention, the processor 3 may execute computer programs stored in memory 2, such as the modules described in FIGS. 6-14 to implement the following functions.

When it is detected that an electronic device binding option built in a browser is triggered, retrieving a dialog box built in the browser, where at least one electronic device binding function option may be set in the dialog box, and one electronic device binding function option corresponds to triggering of one electronic device binding function.

When it is detected that an electronic device binding function option is triggered, executing a corresponding electronic device binding function in the background, and sending first information to a server.

After the server determines that a preset correspondence exists between second information sent by a second electronic device and the first information and establishes a binding relationship between a first electronic device and the second electronic device, sharing information between the first electronic device and the second electronic device.

The embodiments in this specification are described in a progressive manner, each embodiment focuses on a difference from other embodiments, and for same or similar parts in the embodiments, reference may be made to these embodiments. Apparatuses disclosed in the embodiments correspond to methods disclosed in the embodiments, and therefore are described briefly; for related parts, reference may be made to partial descriptions in the methods.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the description in the embodiments disclosed in this specification, method or algorithm steps may be directly implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the technical field.

The foregoing description of the disclosed embodiments enables a person skilled in the art to implement or use the present invention. It is apparent to a person skilled in the art to make various changes to these embodiments. The general concept defined in the specification may be implemented in other embodiments without departing from the spirit and scope of the present invention. Therefore, the present invention is not limited to these embodiments shown in the specification, and instead is to meet the widest range consistent with the principles and novel features disclosed in the specification.

What is claimed is:

1. An information sharing method, used by a first electronic device, the first electronic device having a processor and a memory for storing one or more programs to be executed by the processor, the method comprising:
retrieving a dialog box built in a browser, when an electronic device binding option built in the browser is triggered, the dialog box set with at least one electronic device binding function option, and one electronic device binding function option corresponding to triggering of one electronic device binding function;
executing a corresponding electronic device binding function, comprising:
generating a 2D code having a first electronic device identifier representation information and displaying the 2D code in a child dialog box of the dialog box;
sending a first information to a server, when it is detected that an electronic device binding function option is triggered;
establishing a binding relationship between the first electronic device and a second electronic device, after the server determines that a preset correspondence exists between second information sent by the second electronic device and the first information; and
sharing information between the first electronic device and the second electronic device.

2. The information sharing method according to claim 1, wherein the first information comprises the first electronic device identifier representation information and a first electronic device identifier information.

3. The information sharing method according to claim 2, wherein the establishing the binding relationship between the first electronic device and the second electronic device, comprises:
after the second electronic device scans the 2D code and determines the first electronic device identifier representation information, receiving the second information that is sent by the second electronic device and comprises the first electronic device identifier representation information.

4. The information sharing method according to claim 3, further comprising:
determining that the preset correspondence exists between the second information and the first information when the first electronic device identifier representation information in the first information and the first electronic device identifier representation information in the second information match each other; and
when a browser of the second electronic device is in an open state:
sending the first electronic device identifier information to the second electronic device, to establish the binding relationship between the first electronic device and the second electronic device; or
sending the second electronic device identifier information comprised in the second information to the first electronic device, to establish the binding relationship between the first electronic device and the second electronic device.

5. The information sharing method according to claim 1, wherein the executing the corresponding electronic device binding function, further comprises:
sending a signal including the first electronic device identifier representation information in a background of the first electronic device, so that the second electronic device in a signal monitoring state monitors the signal.

6. The information sharing method according to claim 5, wherein the establishing the binding relationship between the first electronic device and the second electronic device, comprises:
after the second electronic device in a signal monitoring state monitors the signal and determines the first electronic device identifier representation information, receiving the second information that is sent by the second electronic device and comprises the first electronic device identifier representation information.

7. The information sharing method according to claim 6, further comprising:
determining that the preset correspondence exists between the second information and the first information when the first electronic device identifier representation information in the first information and the first electronic device identifier representation information in the second information match each other; and
when a browser of the second electronic device is in an open state:
sending the first electronic device identifier information to the second electronic device, to establish the binding relationship between the first electronic device and the second electronic device; or
sending the second electronic device identifier information comprised in the second information to the first electronic device, to establish the binding relationship between the first electronic device and the second electronic device.

8. The information sharing method according to claim 1, wherein the executing the corresponding electronic device binding function, further comprises:
opening a Location Based Services (LBS) function in the background;
wherein the first information comprises: a first location information of the first electronic device, a browser open state information, and the first electronic device identifier information; and
wherein the sending first information to a server comprises: sending the first information comprising the first location information of the first electronic device, the browser open state information, and the first electronic device identifier information to the server.

9. The information sharing method according to claim 8, wherein the establishing the binding relationship between the first electronic device and the second electronic device, comprises:
receiving the second information that is sent by the second electronic device in which an LBS function is opened and comprises a second location information of the second electronic device and a browser switch state information.

10. The information sharing method according to claim 9, further comprising:
determining that the preset correspondence exists between the second information and the first information when a location corresponding to the first location information and a location corresponding to the second location information meet a preset location relationship, and the browser switch state information and the browser open state information correspond to each other; and
sending the first electronic device identifier information to the second electronic device, to establish the binding relationship between the first electronic device and the second electronic device; or
sending the second electronic device identifier information comprised in the second information to the first electronic device, to establish the binding relationship between the first electronic device and the second electronic device.

11. The information sharing method according to claim 1, wherein the executing the corresponding electronic device binding function in the background, further comprises:
obtaining a user account of the first electronic device to perform account login;
wherein the first information comprises a user account information of the first electronic device and the first electronic device identifier information; and
wherein the sending first information to a server comprises sending the first information comprising the user account information of the first electronic device and the first electronic device identifier information to the server.

12. The information sharing method according to claim 11, wherein the establishing the binding relationship between the first electronic device and the second electronic device, comprises:
receiving the second information that is sent by the second electronic device and the second information comprising a user account information of the second electronic device after the second electronic device obtains the second user account of the second electronic device to perform account login.

13. The information sharing method according to claim 12, further comprising:
determining that the preset correspondence exists between the second information and the first information when the user account information of the first electronic device and the user account information of the second electronic device are same; and
when a browser of the second electronic device is in an open state:
sending the first electronic device identifier information to the second electronic device, to establish the binding relationship between the first electronic device and the second electronic device; or
sending the second electronic device identifier information comprised in the second information to the first electronic device, to establish the binding relationship between the first electronic device and the second electronic device.

14. An information sharing apparatus, applied to a first electronic device, the information sharing apparatus comprising:
a processor; and
a memory coupled to the processor for storing one or more programs for execution by the processor, the one or more programs including instructions for:
retrieving a dialog box built in a browser, when an electronic device binding option built in the browser is triggered, the dialog box set with at least one electronic device binding function option, and one electronic device binding function option corresponding to triggering of one electronic device binding function;

executing a corresponding electronic device binding function comprising:

generating a 2D code having a first electronic device identifier representation information and display the 2D code in a child dialog box of the dialog box;

sending a first information to a server, when it is detected that an electronic device binding function option is triggered;

establishing a binding relationship between the first electronic device and a second electronic device, after the server determines that a preset correspondence exists between second information sent by the second electronic device and the first information; and sharing information between the first electronic device and the second electronic device.

15. The information sharing apparatus according to claim 14, wherein the first information comprises the first electronic device identifier representation information and a first electronic device identifier information, and the establishing the binding relationship between the first electronic device and the second electronic device, comprises:

after the second electronic device scans the 2D code and determines the first electronic device identifier representation information, receiving the second information that is sent by the second electronic device and comprises the first electronic device identifier representation information.

16. The information sharing apparatus according to claim 14, wherein the executing the corresponding electronic device binding function in the background, further comprises:

sending a signal including the first electronic device identifier representation information in a background of the first electronic device, so that the second electronic device in a signal monitoring state monitors the signal.

17. The information sharing apparatus according to claim 16, wherein the establishing the binding relationship between the first electronic device and the second electronic device, comprises:

after the second electronic device in a signal monitoring state monitors the signal and determines the first electronic device identifier representation information, receiving the second information that is sent by the second electronic device and comprises the first electronic device identifier representation information.

18. The information sharing apparatus according to claim 14, wherein the executing the corresponding electronic device binding function in the background, further comprises:

opening a Location Based Services (LBS) function in the background;

wherein the first information comprises: a first location information of the first electronic device, a browser open state information, and the first electronic device identifier information; and wherein the sending first information to a server comprises: sending the first information comprising the first location information of the first electronic device, the browser open state information, and the first electronic device identifier information to the server.

19. The information sharing apparatus according to claim 14, wherein the executing the corresponding electronic device binding function in the background, further comprises:

obtaining a user account of the first electronic device to perform account login;

wherein the first information comprises a user account information of the first electronic device and the first electronic device identifier information; and wherein the sending first information to a server comprises sending the first information comprising the user account information of the first electronic device and the first electronic device identifier information to the server.

20. A non-transitory computer readable medium storing executable computer program instructions for information sharing, the computer program instructions comprising instructions for:

retrieving a dialog box built in a browser, when an electronic device binding option built in the browser is triggered, the dialog box set with at least one electronic device binding function option, and one electronic device binding function option corresponding to triggering of one electronic device binding function;

executing a corresponding electronic device binding function, comprising:

generating a 2D code having a first electronic device identifier representation information and displaying the 2D code in a child dialog box of the dialog box;

sending a first information to a server, when it is detected that an electronic device binding function option is triggered;

establishing a binding relationship between the first electronic device and a second electronic device, after the server determines that a preset correspondence exists between second information sent by the second electronic device and the first information; and sharing information between the first electronic device and the second electronic device.

* * * * *